G. M. BELTON.
EXPANSION SHELL FOR SCREWS.
APPLICATION FILED MAR. 27, 1911.

1,032,106.

Patented July 9, 1912.

Witnesses
Anna C. Raviler
F. E. Ernst

Inventor
Guy M. Belton
By Bartlett & Bartlett
Attorneys

COLUMBIA PLANOGRAPH CO., WASHINGTON, D. C.

UNITED STATES PATENT OFFICE.

GUY M. BELTON, OF DETROIT, MICHIGAN, ASSIGNOR OF ONE-HALF TO CHARLES D. BROWN, OF PORT HURON, MICHIGAN.

EXPANSION-SHELL FOR SCREWS.

1,032,106.  Specification of Letters Patent.  Patented July 9, 1912.

Application filed March 27, 1911. Serial No. 617,038.

*To all whom it may concern:*

Be it known that I, GUY M. BELTON, a citizen of the United States of America, residing at Detroit, in the county of Wayne and State of Michigan, have invented certain new and useful Improvements in Expansion-Shells for Screws, of which the following is a specification, reference being had therein to the accompanying drawings.

This invention relates to expansion shells for retaining lag screws, bolts or the like in structures of concrete or masonry and the like. The shells are devised for the purpose of ready insertion and of retaining the companion screws or bolts in such manner that they do not vibrate, rattle or work loose.

The invention consists in the matters hereinafter set forth, and more particularly pointed out in the appended claims.

Figure 1:
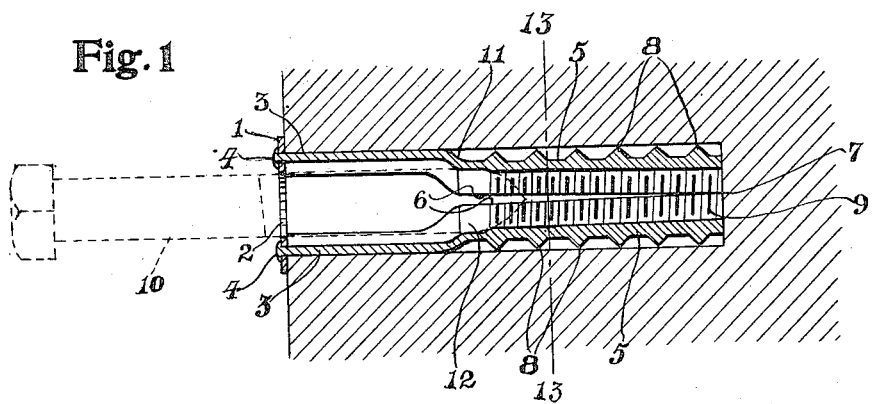
Figure 2:
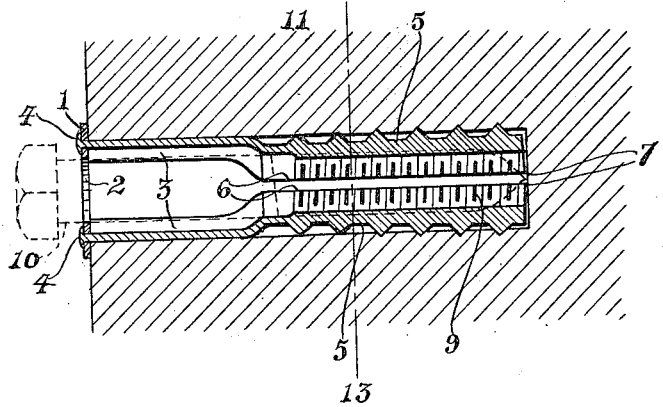
Figure 3:
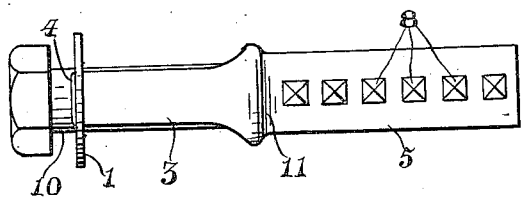
Figure 4:
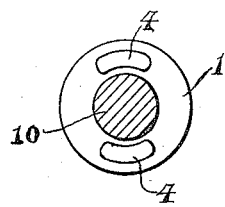

In the drawings, Figure 1 is a view in longitudinal section of an expansion shell that embodies features of the invention, showing the shell as first inserted in a socket in the wall, an entering lag screw also being indicated in dotted lines; Fig. 2 is a view in longitudinal section of the shell fully expanded when spread by the full insertion of the lag screw as indicated by the dotted lines; Fig. 3 is a view in elevation of a shell and lag screw fully inserted therein, taken at right angles to the planes of section of Figs. 1 and 2; and Fig. 4 is a view of the outer end of the shell.

As herein shown in preferred form an outer circular end plate 1 with an opening 2 of the diameter of the body or shank of a lag screw or bolt for which the shell is adapted, connects the outer ends or shanks of a pair of sections forming the main part of the shell. Each section which is substantially semi-cylindrical in cross section has a shank 3 of reduced width that is preferably secured to the plate by a tenon 4 passing through an aperture therein and headed down. The bodies 5 of the sections are slightly inset from the shank portions and have rectilinear margins 6 which, when the shell is closed for insertion in a cylindrical socket in a wall, contact at their outer corners 7 only so that the margins are therefore convergent when in this position. The parts are so proportioned that the bodies, which are exteriorly studded, roughened or provided with projections 8, have anchorage in the wall when expanded, form with the shanks a cylinder of substantially the same diameter from end to end when ready for insertion. The bodies have interior screw threads 9 running from near the outer ends thereof to their other extremities which are parallel or cylindrical for a portion of their length, as to the line 13, and then are conate or tapering. This permits the insertion of a lag screw, indicated at 10, without spreading the shell to such a distance or for so many turns that the threads of the lag screw or shell are not stripped or torn away by any resistance offered to further progress of the lag-screw. When the bodies are forced apart by the further insertion of the lag screw 10 the shanks and untapered portions bear throughout their lengths against the socket of the wall while the tapered parts of the bodies are bent outwardly until the adjacent margins 6 assume substantially parallel relations. This expands the outer portions of the bodies and forces the anchor projections into the masonry. The bore of the unthreaded portions 12 of the section bodies is adapted to have the same diameter as the shank or unthreaded portion of the inserted bolt or lag screw, and, consequently, of the opening 2 of the plate 1. As a result of this construction an inserted lag screw is held at both ends of the shell and between the ends thereof so that it cannot vibrate or rattle in the shell. This obviates the drawing out of the lag screw under vibration as frequently occurs. The permanent assembling of the shell facilitates its insertion into position. Furthermore the parallel or cylindrical portions of the screwthreads permit the temporary insertion or withdrawal of the lag screw without bending or embedding the shell in the surrounding wall, and enable the user to apply sufficient force to drive the screw home and expand the shell against great resistance without stripping the threads.

Obviously changes in the details of construction may be made without departing from the spirit of the invention and I do not care to limit myself to any particular form or arrangement of parts.

What I claim is:

An expansion shell comprising a pair of substantially semi-cylindrical mating sections having unthreaded shank portions, a plate securing the sections at their extremities and having a bolt opening in substantially axial alinement with the sections, the margins of the plate extending beyond the peripheries of the sections and the latter having the longitudinal margins disposed to contact at the outer ends only when the shell is closed and being provided with mating interior cylindrical screw threads for a portion of their lengths adjacent the shanks, and tapered screw-threads for the remainder of their lengths and being off-set inwardly from the shanks with exterior anchorage members.

In testimony whereof I affix my signature in presence of two witnesses.

GUY M. BELTON.

Witnesses:
C. R. STICKNEY,
ANNA C. RAVILER.

Copies of this patent may be obtained for five cents each, by addressing the "Commissioner of Patents, Washington, D. C."